Oct. 4, 1966  F. W. R. STARP  3,276,345
PHOTOGRAPHIC INTRA-LENS SHUTTER WITH IMPROVED PAWL ARRANGEMENT
Filed Aug. 28, 1964  2 Sheets-Sheet 2
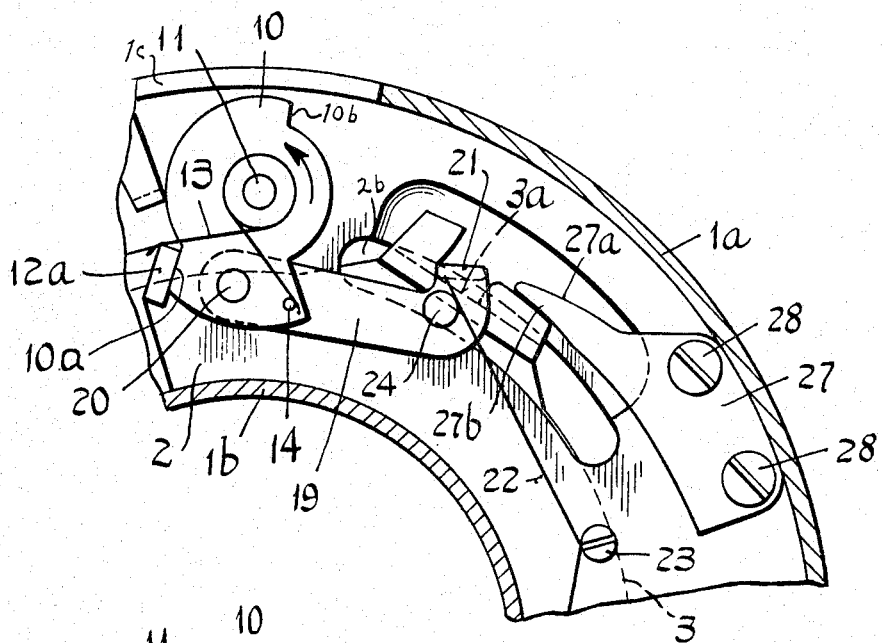
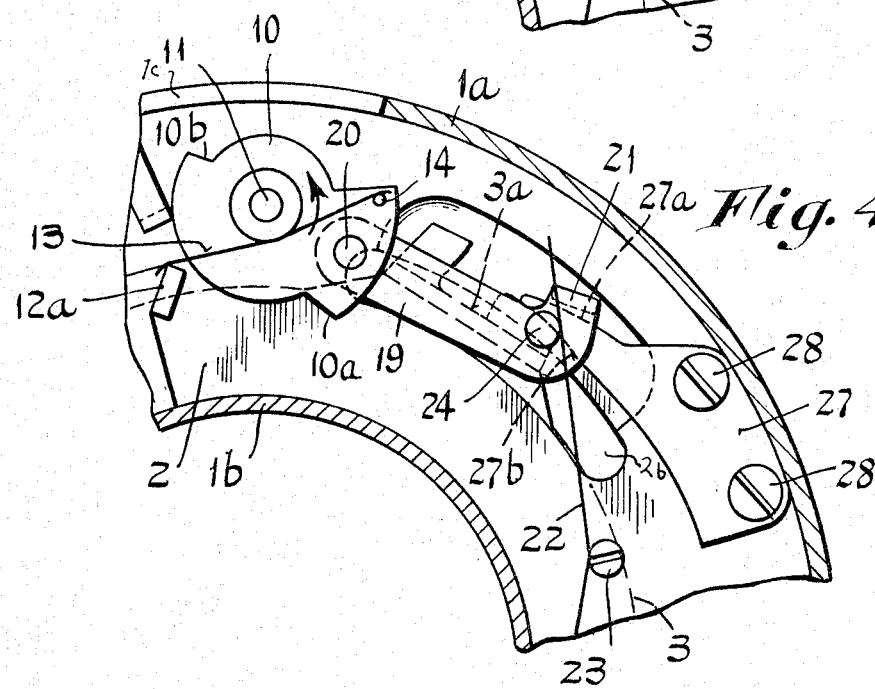
INVENTOR.
Franz W. R. Starp
BY
Arthur A. March
ATTORNEY

United States Patent Office 3,276,345
Patented Oct. 4, 1966

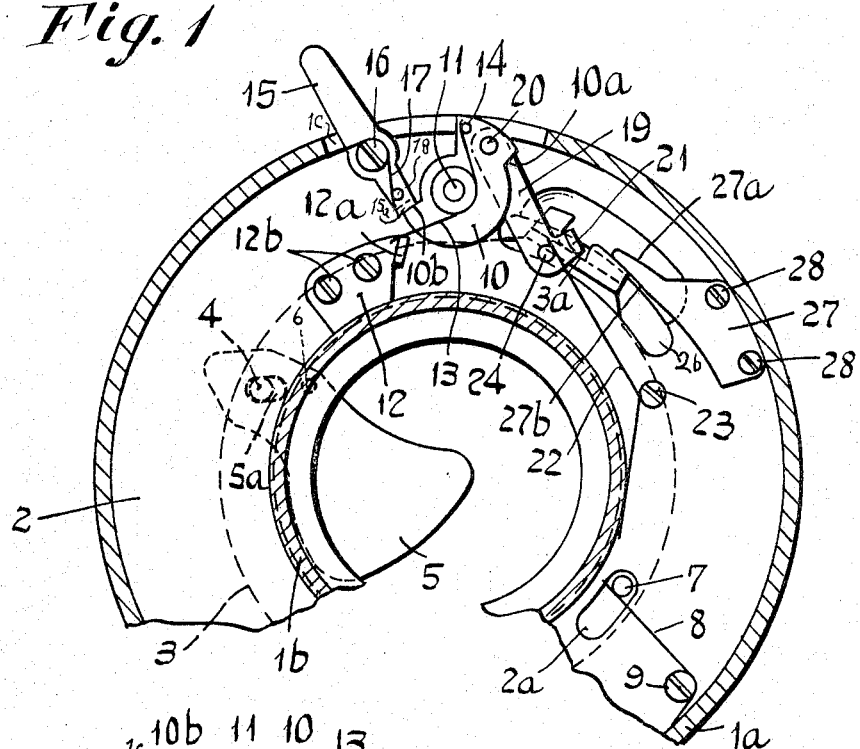
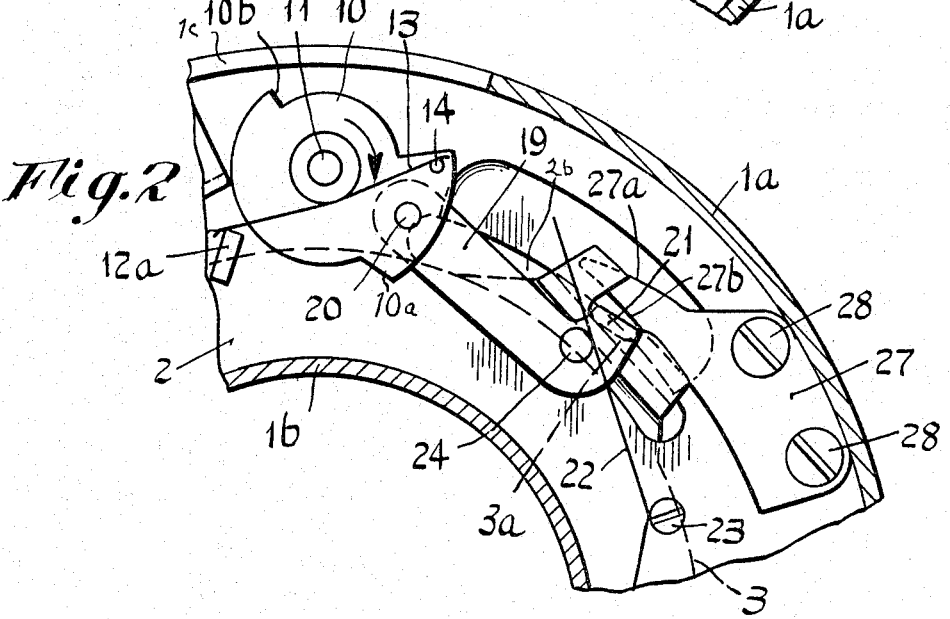

---

3,276,345
PHOTOGRAPHIC INTRA-LENS SHUTTER WITH IMPROVED PAWL ARRANGEMENT
Franz W. R. Starp, Calmbach (Enz), Germany, assignor to Alfred Gauthier, G.m.b.H., Calmbach (Enz), Germany, a corporation of Germany
Filed Aug. 28, 1964, Ser. No. 392,711
Claims priority, application Germany, Sept. 13, 1963, G 38,675
3 Claims. (Cl. 95—63)

The present invention relates to a photographic intra-lens shutter of the type in which a spring-driven actuating member is connected to the shutter blade driving ring by means of a driving pawl, one end of which is articulatively connected to the actuating member. The driving pawl comprises at its free end an elongated, rounded member which extends in the direction of the shutter axis and approximately tangentially with respect to the circumference of the shutter blade driving ring. This elongated, rounded member is held in engagement with a suitably shaped recess, or notch, in the shutter blade driving ring by means of a spring pressing upon the pawl.

An intra-lens shutter developed according to the proposals of the United States patent application S.N. 379,331, assigned to the assignee of the present application, is especially distinguished by the fact that the driving pawl remains dependably in engagement with the raised portion of the shutter blade driving ring during the running-down motion of the shutter drive. Moreover, only an extremely weak spring need be used to maintain the connection between the driving pawl and the shutter blade driving ring, thereby insuring a maximum of safety against unintentional opening of the shutter blades during the cocking of the shutter. In addition, this arrangement makes it possible to dispense with the usual securing spring which acts on the shutter blade driving ring in order to prevent an unintentional opening of the shutter blades during the cocking process of the shutter.

It is one object of the present invention to provide an improved shutter blade driving system of the type having a rounded actuating member and a notch of matching shape in the shutter blade driving ring in such a manner as to avoid from the outset any interfering or disturbing effects on the system.

It has been possible for disturbances in the shutter blade driving system to occur as a result of the impact of the spring driven actuating member on the associated member of an escapement mechanism, or of a B-lever temporarily interrupting the running down of the shutter. In order to solve this problem, the present invention proposes the arrangement of an elongated, somewhat pointed, guide plate which extends approximately tangentially to the shutter blade driving ring. The guide plate is so arranged with respect to the movable driving pawl that the elongated member is guided by the outer edge of the guide plate during the cocking of the shutter. However, during the running-down of the shutter, the driving pawl is not influenced by the inner edge of the guide plate, but is secured against leaving the recess in the shutter blade driving ring without involving any significant increase in cost or in the space required. This arrangement eliminates the possibility of having the elongated member of the driving pawl leave the recess in the shutter blade driving ring during the running-down of the shutter mechanism, even if the angular momentum is very great.

Another object of the invention is to prevent any concomitant movement of the driving ring during the cocking process which may result from the increased frictional resistances between the shutter blade driving ring and the elongated member of the driving pawl. Such frictional resistances would otherwise necessarily result in an unintentional opening of the shutter. Such a defect can be effectively avoided if the elongated member of the driving pawl is kept away from the shutter blade driving ring during the cocking process, by riding up the outer edge of the guide plate and, therefore, scarcely touches the shutter blade driving ring.

A further object of the invention is to prevent any unnecessary increase in the cocking moment of the shutter blade driving system by providing that the outer edge and inner edge of the guide plate enclose an acute angle. The angle only needs to be such that the outer side thereof guides the elongated member of the driving pawl over the outer circumference of the portion of the shutter blade driving ring which is provided with the opening, or recess.

Structurally, a further simplification of the arrangement disclosed, according to the present invention, can be obtained in that the guide plate could be a component of the bearing plate of an escapement mechanism for controlling the exposure time, or shutter speed.

Details of the invention will become apparent from the specification which follows and from the accompanying drawings in which:

FIG. 1 is a view of the interior of an intra-lens shutter, with the driving system, which is designed for the opening and closing motion of the shutter blades, in cocked position;

FIG. 2 shows the shutter blade driving system on an enlarged scale during the running-down motion;

FIG. 3 shows the shutter blade driving system in the position which it occupies after the exposure is completed; and FIG. 4 shows the shutter blade driving system during the cocking process, with the driving pawl sliding along at the outer edge of the guide plate.

A case-like shutter housing 1 is provided with an outer wall 1a, an inner wall 1b, and a base plate 2. A shutter blade driving ring 3, which is rotatably arranged between the base plate 2 and the bottom of the shutter housing 1 engages, by means of pins 4, slots 5a of shutter blades 5. While in actual construction of this embodiment there are several shutter blades 5, each pivotally mounted on its own bearing pin 6 affixed to the housing 1, for the sake of clarity only one shutter blade is shown in the drawings. If the shutter blade driving ring 3 rotates clockwise with respect to FIG. 1, the shutter blades 5 are pivoted in such a manner as to open the lens aperture and conversely to close the aperture when the ring is rotated in the opposite direction. The angle of rotation of the shutter blade driving ring 3 is limited by a stop pin 7 which projects into a slot 2a of the base plate 2. The pin 7 is acted upon by one end of a closing spring 8 which is wound about a screw 9 secured to the housing. The other end of the springs 8 abuts against the outer housing wall 1a. The closing spring 8 tends to keep the shutter closed.

A disk-like actuating member 10 is mounted on a cocking shaft 11 which is rotatably positioned on the base plate 2 in the housing 1. The clockwise rotary running-down motion of the actuating member 10 is limited by a stop edge 10a which abuts against a flange 12a of a spring stop 12. The stop 12 in turn is secured to the base plate 2 by means of two screws 12b. A driving spring 13 tends to bring about the clockwise rotation of the actuating member 10. For this purpose, one end of the driving spring 13 bears against the fixed flange 12a and the other end engages a pin 14 located on the actuating member 10. A release lever 15 comprises a lug 15a which is adapted to engage a stop edge 10b of the actuating member 10 so as to prevent the member 10 from rotating out of the cocked position illustrated in FIG. 1. The release lever 15 is rotatably mounted on the base plate 2 by means of a fixed screw 16. A coil spring 17 held in place by the screw 16 tends to rotate the release lever 15 counterclockwise, thus keeping the release lever 15 in engagement with the actuating member 10. One end of the spring 17 acts against the outer wall 1a of the shutter housing 1 and the other end is hooked over a spring pin 18 of the release lever 15. The release lever 15 as well as the actuating member 10 project into an opening 1c of the outer wall 1a of the shutter housing 1.

A driving pawl 19 is articulately connected to the actuating member 10 by a pin 20 and is bent up at its free end where it carries an elongated rounded member 21 which extends in the direction of the shutter axis. The elongated member 21 has two rounded engaging edges and extends through a window 2b of the base plate 2 to engage a recess 3a of the shutter blade driving ring 3. One end of a weak adjusting spring 22 held by a fixed screw 23 abuts against the inner wall 1b, while the other end engages a pin 24 of the driving pawl 19, thereby keeping the latter in engagement with the shutter blade driving ring 3.

Associated with the elongated member 21 of the driving pawl 19 is a guide plate 27 which may be bolted onto the base plate 2 of the shutter housing 1 by means of screws 28. One end of the plate 27 is elongated and somewhat pointed, more graphically described as beak-shaped, and is arranged in the range of motion of the driving pawl 19 so as to guide the elongated member 21 positively up and down on the outer edge 27a during the cocking process of the shutter, as may be seen in FIG. 4. During the running down of the shutter, as shown in FIG. 2, the elongated member 21 is able to move freely with respect to the inner edge 27b of the guide plate 27. The arrangement is such that the guide plate 27 leaves the opening 3a of the shutter blade driving ring 3 open when the driving system is in the non-cocked starting position, and closes the opening in the reversing phase of the shutter blade driving ring. The result is to prevent the elongated member 21, in this critical phase of motion of the shutter blade driving ring 3, from moving out of the opening 3a. For this purpose, the engaging edges of the recess in the shutter blade driving ring 3 open radially, and must be made long enough to extend substantially, at least, to the inner edge 27b of the plate 27. The outer and inner edges 27a and 27b of the guide plate 27 are arranged so as to form an acute angle. If it is intended to use the plate 27 in a shutter equipped with an escapement mechanism for regulating the exposure time, the beak-shaped guide plate 27 may be a component of the bearing plate of an escapement mechanism.

The above-described shutter arrangement equipped with a guide plate operates in the following manner:

After the shutter release lever 15 is rotated clockwise out of the cocked position illustrated in FIG. 1, the actuating member 10 is released for the running-down of the system. The shutter blade driving ring 3 is thereby caused to reciprocate in a manner known per se, by way of the driving pawl 19, and this causes an opening and closing motion of the shutter blades 5. During this process, the elongated member 21 of the driving pawl 19 moves back and forth under the inner edge 27b of the guide plate 27. After the shutter has fully opened to the position shown in FIG. 2 and has closed to the position in FIG. 3, which is the run-down position, the driving pawl 19 occupies a position such that during subsequent cocking process wherein the actuating member 10 executes a counterclockwise rotary motion, the elongated member 21 first slides out of the recess 3a and then slides up and down along the upper edge 27a of the beak-shaped guide plate 27. In the final phase of the cocking motion, the elongated member 21 of the driving pawl 19 again engages in the recess 3a due to the action of the spring 22. The locking of the actuating member 10 is effected by the release member 15 at the end of the cocking process.

While the invention has been illustrated by only one embodiment, it will be recognized that modifications may be made therein without departing from the spirit of the invention or the scope of the following claims.

What is claimed is:

1. In a photographic intra-lens shutter mechanism; a disc-shaped actuating member; a driving spring connected to said member to operate the same; a shutter blade; a shutter blade driving ring having a recess in its periphery; a driving pawl, one end of which is articulately connected to said disc-shaped actuating member; an elongated rounded member extending from the free end of said driving pawl and shaped to engage with said recess; a beak-shaped guide plate extending approximately tangentially to said shutter blade driving ring and over the range of positions occupied by said elongated rounded member during the most wide-open positions of said shutter blade, said guide plate comprising an inner and an outer edge, the arrangement of said plate being such that said elongated rounded member of said pawl is positively guided by said outer edge during the cocking process of said shutter mechanism, but is not influenced by said inner edge during the running-down process of said shutter mechanism, said inner edge being adapted to secure said elongated rounded member against moving out of said recess in said shutter blade driving ring during the running-down process of said shutter mechanism.

2. A photographic intra-lens shutter mechanism according to claim 1, wherein said inner and said outer edges of said beak-shaped guide plate form an acute angle.

3. A photographic camera according to claim 1, including an escapement mechanism designed to regulate exposure; a bearing plate comprising one element of said escapement mechanism, said beak-shaped guide plate forming part of said bearing plate.

References Cited by the Examiner
UNITED STATES PATENTS 2,949,075   8/1960   Rentschler _____ 95—63

JOHN M. HORAN, *Primary Examiner.*